United States Patent
Levitan et al.

[11] Patent Number: 5,918,044
[45] Date of Patent: Jun. 29, 1999

[54] APPARATUS AND METHOD FOR INSTRUCTION FETCHING USING A MULTI-PORT INSTRUCTION CACHE DIRECTORY

[75] Inventors: David Stephen Levitan; John Stephen Muhich, both of Austin, Tex.

[73] Assignee: International Business Machines Corporation, Armonk, N.Y.

[21] Appl. No.: 08/741,465

[22] Filed: Oct. 31, 1996

[51] Int. Cl.[6] ...................................................... G06F 9/32
[52] U.S. Cl. ...................... 395/582; 711/125; 364/261.7; 364/938; 364/948
[58] Field of Search .................................. 711/125, 128; 395/382, 581, 585, 586, 800.23, 587, 376, 582, 383; 364/261.7, 938

[56] References Cited

U.S. PATENT DOCUMENTS

| | | | |
|---|---|---|---|
| H1291 | 2/1994 | Hinton et al. | 395/800.23 |
| 4,991,080 | 2/1991 | Emma et al. | 395/382 |
| 5,034,880 | 7/1991 | Fong et al. | 395/581 |
| 5,127,091 | 6/1992 | Boufarah et al. | 395/585 |
| 5,136,697 | 8/1992 | Johnson | 395/586 |
| 5,210,842 | 5/1993 | Sood | 711/125 |
| 5,367,703 | 11/1994 | Levitan | 395/800.23 |
| 5,434,985 | 7/1995 | Emma et al. | 395/587 |
| 5,574,871 | 11/1996 | Hoyt et al. | 395/376 |
| 5,594,884 | 1/1997 | Maboba et al. | 711/125 |
| 5,634,103 | 5/1997 | Dietz et al. | 395/582 |
| 5,689,672 | 11/1997 | Witt et al. | 395/383 |

*Primary Examiner*—John W. Cabeca
*Assistant Examiner*—Fred F. Tzeng
*Attorney, Agent, or Firm*—Anthony V.S. England; John G. Graham; Andrew J. Dillon

[57] ABSTRACT

In an instruction fetch unit for an information handling system which decodes instructions, calculates target addresses of multiple branch instructions, and resolves multiple branch instructions in parallel instead of sequentially, the critical path through a multiple way set associative instruction cache is through a directory and compare circuit which selects which way instructions will be retrieved. This patch is known as the late select path. A multi-ported effective address (EA) directory is provided and is accessed prior to selection of a fetch address which fetches the next set of instructions from the cache. In this manner, the time required for the late select path can be reduced.

41 Claims, 5 Drawing Sheets

APPARATUS AND METHOD FOR INSTRUCTION FETCHING USING A MULTI-PORT INSTRUCTION CACHE DIRECTORY

CROSS-REFERENCE TO RELATED APPLICATIONS

APPARATUS AND METHOD FOR INSTRUCTION FETCHING IN AN INFORMATION HANDLING SYSTEM, Ser. No. 08/754,377.

TECHNICAL FIELD OF THE INVENTION

The present invention relates to information handling systems and methods for operating information handling systems, and more particularly, to instruction fetch units within an information handling system and methods for fetching instructions in an information handling system.

BACKGROUND OF THE INVENTION

The presence of branch instructions in the instruction stream has long been an obstacle to achieving high performance in a processor or central processing unit (CPU) of an information handling system. Branch instructions select between a first sequential path of instructions and a second branch path of instructions as the subsequent instructions to be processed by the processor. Branch instructions alter the instruction stream's inherent, straight-line flow of control, and typically cause the CPU to stall while those instructions along the branch path are fetched from a cache or from memory.

Branch instructions introduce additional processing delay by the CPU. First, some delay occurs between the time a branch instruction is loaded into an instruction queue (IQ) after being fetched from an instruction cache (IC) and the time when it is decoded and found to be a branch. Second, if an instruction is found to be a conditional branch, there is often additional delay required for the condition on which the branch is based to be computed. After the condition on which the branch is based is computed, the branch is said to be resolved. Finally, after a branch has been resolved, and if it is taken, the IC must be accessed and instructions in the IQ purged and replaced with those instructions which logically follow the branch instruction.

Existing solutions

Figure 1:
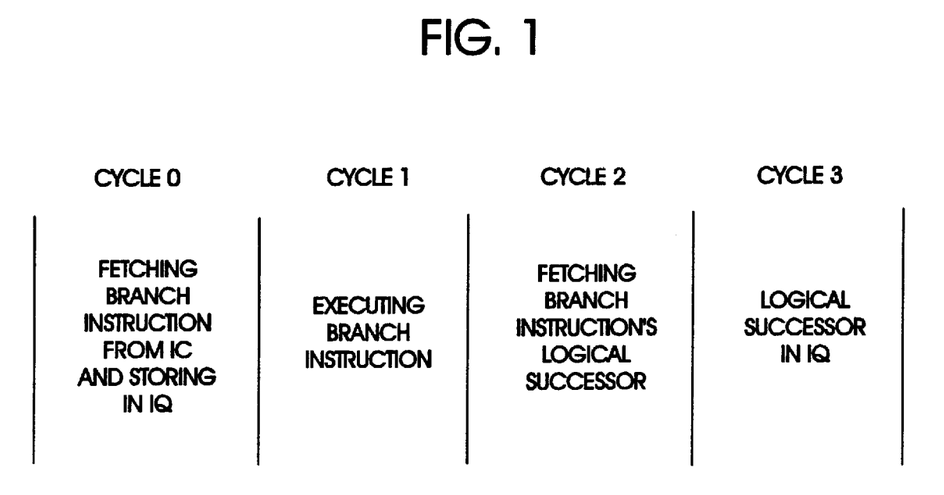
FIG. 1 is a cycle time line illustrating a prior art approach to fetching instructions in an information handling system.

There are a number of existing solutions for reducing the additional processing delay caused by branch instructions, each of which provides a varying degree of effectiveness. The simplest solution is to do nothing about the additional processing delay and incur the maximum penalty or amount of time to process a branch instruction. This approach is depicted in the cycle time line of FIG. 1. In this approach, a branch instruction is fetched from the IC and stored in the IQ during one or more processing clock cycles of the CPU. Once a branch is in the IQ, it takes some time for the CPU to identify the instruction as a branch and execute it. It may take a cycle for the branch to execute. Executing a branch instruction involves three steps. First, the branch instruction or any other instruction, branch or otherwise, is decoded by the CPU to determine whether the instruction is a branch instruction. Second, if the instruction is a branch instruction, then the outcome of the branch instruction is resolved or predicted. Determining the outcome of the branch instruction means determining whether a branch instruction is "taken." A branch instruction is said to be "taken" when the second branch path of instructions is selected, thereby altering, or jumping from the first sequential or straight-line path of instructions. If a branch instruction is "not taken," then the instruction stream continues along the first sequential path of instructions. If a branch instruction cannot be resolved, i.e., the outcome cannot be determined, due to an unfulfilled condition, then the outcome of the branch instruction must be predicted. Finally, the target address of the branch instruction, i.e., the address of the instruction to which the branch instruction branches or jumps to (the branch instruction's logical successor), is calculated. The target address is the address of the first instruction in the second branch path of instructions. After branch instruction execution, the branch instruction's logical successor may be fetched and placed in the IQ in the subsequent cycle. If it is determined that the branch has been mispredicted, there are often additional penalty cycles before instructions along the correct path can be fetched and placed in the IQ. Because of its large branch instruction penalty, this scheme is not used in any of today's high-performance processors.

Figure 2:
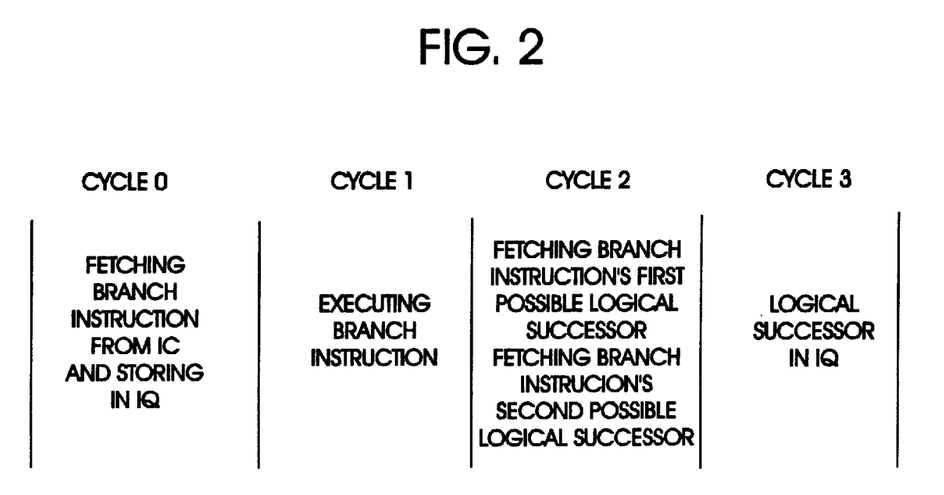
FIG. 2 is a cycle time line illustrating another prior art approach to fetching instructions in an information handling system.

To avoid waiting a cycle for the IQ to be filled after a mispredicted branch, both of a branch's possible paths may be fetched simultaneously as depicted in FIG. 2. Once a branch is detected in the IQ, the branch's predicted outcome is determined and instructions along the expected branch path are placed in the IQ while those instructions along the alternate path are placed in an alternate path buffer. If the branch is predicted correctly, then the behavior of this scheme is similar to that of the scheme depicted in FIG. 2. However, if the branch is mispredicted, then fetching both branch paths in parallel allows the IQ to be filled soon after the misprediction is detected by taking the instructions from the alternate path buffer. The main problem with this approach is that it requires an instruction cache port for each branch path, which also limits the number of branches which may be executed in a cycle. Furthermore, fetching alternate branch paths increases design complexity because several alternate path buffers are required to store the large number of alternate paths resulting from multiple outstanding predicted conditional branches. Additional complexity results from the need to load the IQ from any one of these alternate path buffers.

Figure 3:
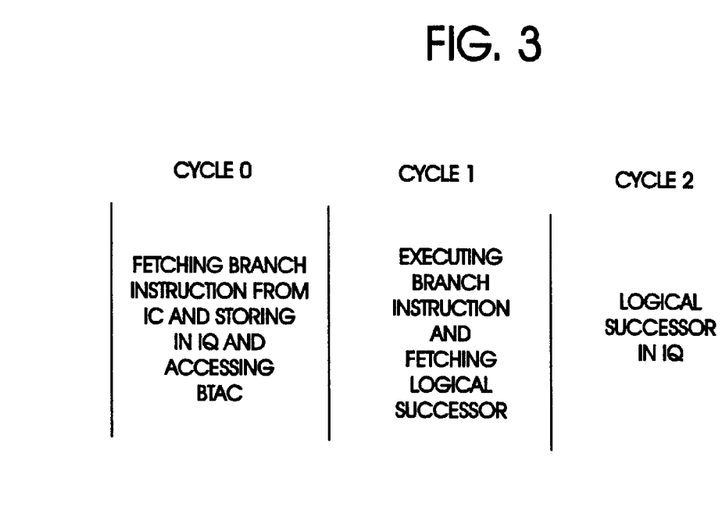
FIG. 3 is a cycle time line illustrating yet another prior art approach to fetching instructions in an information handling system.

Another approach makes use of a Branch Target Address Cache (BTAC). The cycle time line of this approach is depicted in FIG. 3. The BTAC, which is accessed in parallel with the instruction cache, provides a guess of the address of the instruction to be fetched during the subsequent cycle. Only entries for branches which are known to be taken or predicted to be taken during their next execution are stored in the BTAC. A set of tags in the BTAC determines whether or not a given fetch address is contained in the BTAC. If a BTAC access is a miss, it is assumed that the current set of instructions being fetched from the instruction cache contains either no branches at all, or one or more not-taken branch instructions. If the BTAC access hits, the resulting address is used as the instruction fetch address during the subsequent cycle. This technique avoids a delay between the time a taken branch instruction is loaded into the IQ and the time at which the instructions in the branch path are available. If the subsequent fetch address is mispredicted, it will take one or more additional cycles for the correct instructions to be fetched from the instruction cache. BTAC-based designs suffer from increased design complexity, an increased demand for space for the BTAC array, performance penalties when the BTAC mispredicts outcomes, and difficulty with the BTAC update policy.

In each of the three approaches discussed above, the three steps in the executing of a branch instruction are performed sequentially or in series. That is, first, the instruction is decoded to determine whether the instruction is a branch instruction, and after this is determined, the branch instruction is predicted if unresolved. After the branch instruction is resolved or predicted, the target address of the branch instruction can be calculated so that the branch instruction's logical successor can be calculated.

In the related patent application, of common assignee herewith, having Ser. No. 08/754,377, an apparatus and method is disclosed which performs the decoding, predicting, resolving, and target address calculating in parallel or during the same time so that a plurality of addresses for the logical successors of branch instructions are provided in parallel to the instruction cache. These addresses, also known as potential fetch addresses, are calculated in the early part of a cycle and the instruction cache is accessed in the latter part of the cycle. Before a directory (a real address directory) associated with the instruction cache can be accessed, the potential fetch addresses must be generated and one of them must be selected since the directory is single ported, i.e., only has a single read port. The potential fetch addresses must also be translated by a single-ported translation shadow array which converts the potential fetch addresses from effective addresses to real addresses before one of the fetch addresses are selected. Thus, in each of the three approaches discussed above, accessing of the instruction cache with the fetch address to fetch a branch instruction's logical successor is performed sequentially after execution of the branch instruction. The time it takes to select one of the potential fetch addresses is longer than the time it takes to generate the potential fetch addresses. The critical path through a set associative instruction cache is generally through a directory to a compare circuit that selects which bank will be selected out of the cache. This critical path is generally referred to as the "late select path." What is needed is an apparatus and method for minimizing the late select path, i.e., decreasing the time in which a bank is selected out of a set associative instruction cache for the instruction fetch unit shown and described in the related patent application, Ser. No. 08/754,377 which is incorporated herein by reference.

SUMMARY OF THE INVENTION

The present invention provides a multi-ported directory coupled to the instruction cache so that potential fetch addresses can access the directory, in parallel, as soon as they are generated and before it is known which of the addresses will be selected as the actual fetch address. And, although the directory is multi-ported, the translation shadow array and real address directory remain single-ported, since the multi-ported directory is an effective address directory.

The present invention is an apparatus for fetching instructions in an information handling system. The apparatus comprises a cache for storing first and second sets of addressable instructions wherein such an instruction has a fetch address for fetching the instruction from the cache. The apparatus further comprises a fetch address selector operably coupled to the cache for providing to the cache a selected fetch address from a plurality of potential fetch addresses and a directory operably associated with the cache for selecting one of the sets from which instructions are fetched. The directory includes a plurality of input ports for inputting the plurality of potential fetch addresses such that the directory is accessed prior to the fetch address selector selecting the fetch address.

The present invention also provides a method for fetching instructions in an information handling system. The method comprises the steps of storing first and second sets of addressable instructions in a cache wherein such an instruction has a fetch address for fetching the instruction from a cache; providing to the cache a selected fetch address from a plurality of potential fetch addresses; and inputting the plurality of potential fetch addresses into a directory for selecting one of the sets from which instructions are fetched such that the directory is accessed prior to providing the cache a selected fetch address.

The present invention provides the advantage of performing instruction decoding, resolution, prediction, and branch target address calculating, in parallel, to achieve higher performance than prior art instruction fetching units by reducing the processing time incurred as a result of a mispredicted branch instruction.

The present invention provides the advantage of allowing multiple branch predictions to be performed, in parallel, to allow more useful computation to be done in a single cycle compared to the prior art.

The present invention also provides the advantage of eliminating the need for alternative path buffers or branch target address caches.

The present invention also provides the advantage of reducing the time required to complete the late select for a set associative instruction cache, thereby increasing the speed in which a new set of instructions can be fetched.

The present invention also provides the advantage of reducing the time required to complete the late select for a set associative instruction cache by utilizing a multi-ported directory of effective addresses instead of real addresses, thereby eliminating the need of a multi-ported real address directory and a multi-ported effective address to real address translation mechanism. This, in turn, saves processor area and power which would be needed to support a multi-ported real address directory and a multi-ported effective address to real address translation mechanism.

DETAILED DESCRIPTION OF A PREFERRED EMBODIMENT OF THE INVENTION

Figure 4:
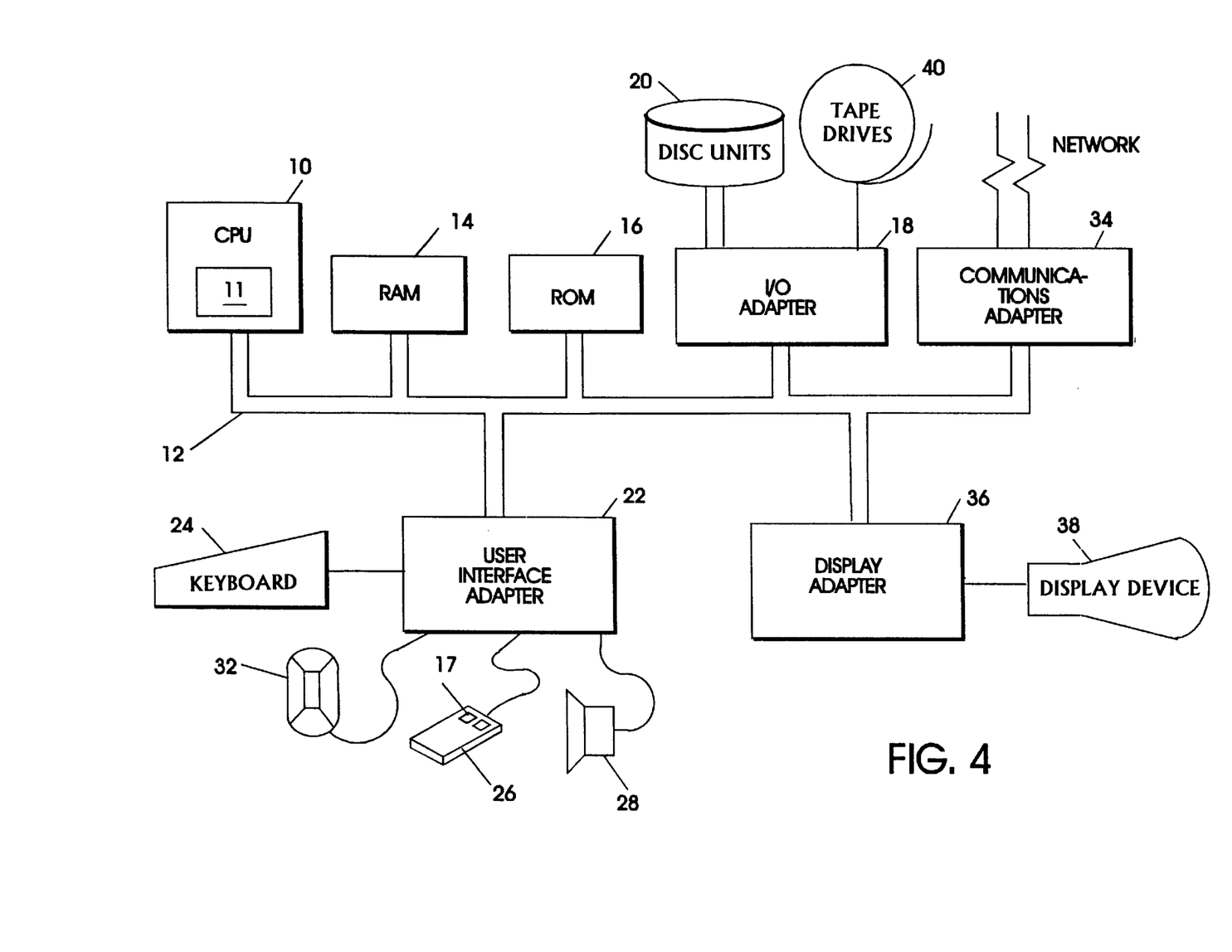
FIG. 4 is an information handling system embodying the present invention.

A representative hardware environment for practicing the present invention is depicted in FIG. 4 which illustrates a typical hardware configuration of an information handling system in accordance with the subject invention having at least one central processing unit (CPU) 10 with an integrated instruction fetch unit 11 and a number of other units such as one or more execution units (not shown) or a memory management unit (not shown). CPU 10 is interconnected via system bus 12 to random access memory (RAM) 14, read only memory (ROM) 16, and input/output (I/O) adapter 18 for connecting peripheral devices such as disc units 20 and tape drives 40 to bus 12, user interface adapter 22 for connecting keyboard 24, mouse 26 having button 17, speaker 28, microphone 32, and/or other user interfaced devices such as a touch screen device (not shown) to bus 12, communication adapter 34 for connecting the information handling system to a data processing network, and display adapter 36 for connecting bus 12 to display device 38.

Figure 5A:
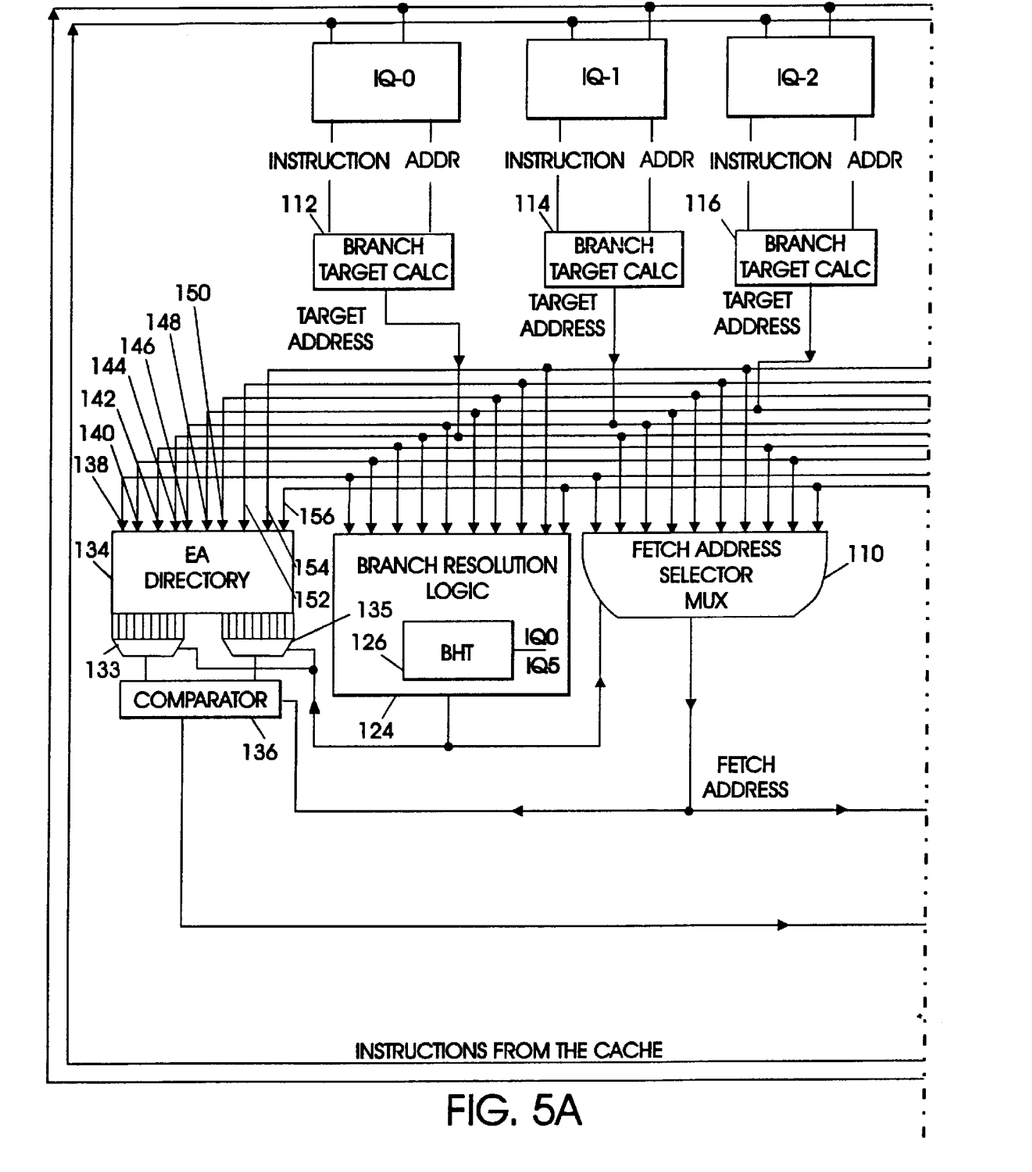
FIG. 5 illustrates an instruction fetch unit according to the present invention.
Figure 5B:
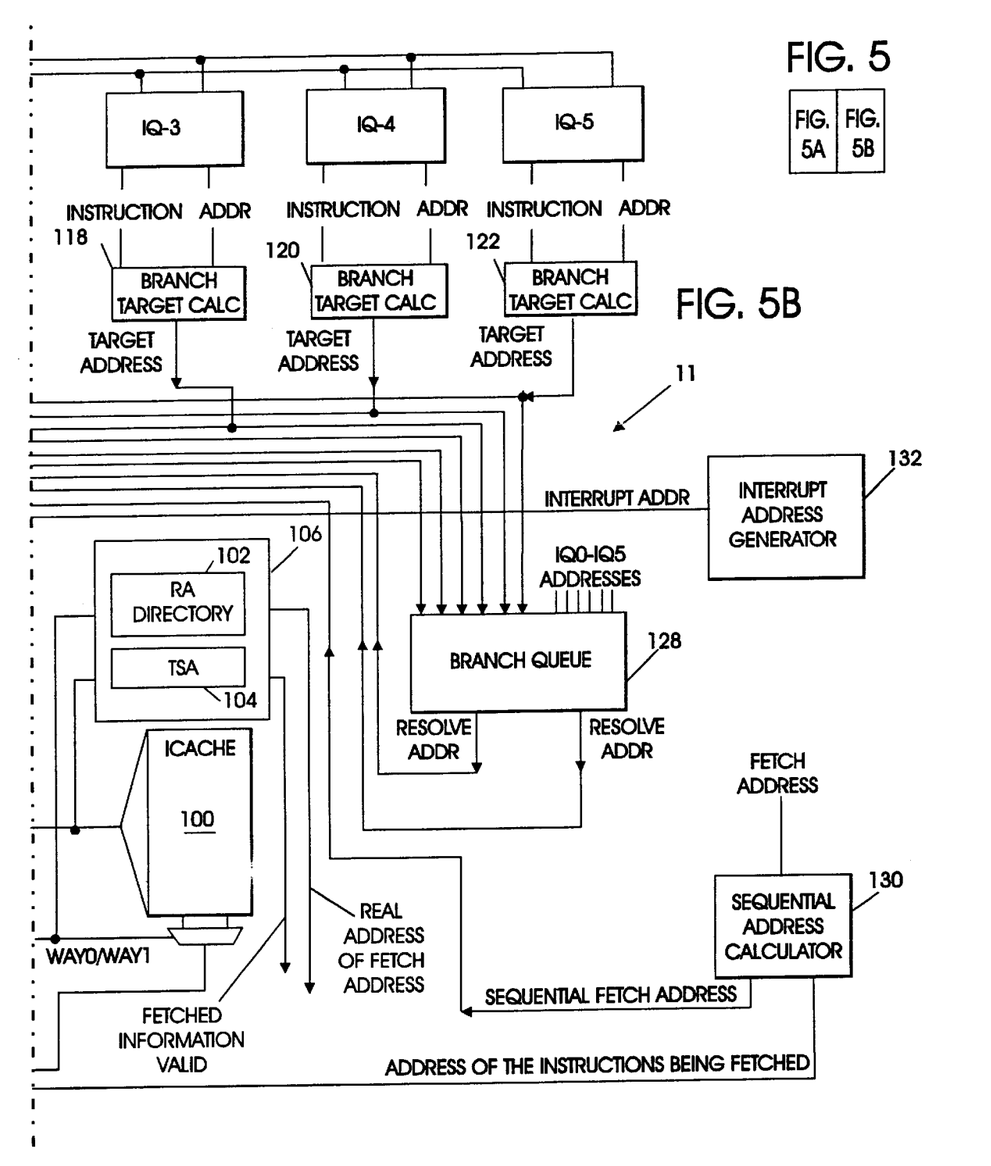

Referring now to FIG. 5, the instruction fetch unit 11 and the method for fetching instructions according to the present invention will be described.

Instruction fetch unit 11 includes instruction cache 100 for storing instructions to be fetched. The instructions to be fetched are located at addressable memory locations. Thus, the instructions are said to be addressable. Instruction fetch unit 11 accesses instruction cache 1000 in an attempt to obtain the instructions in a cache line of memory located at a fetch address. A particular set of instructions, identified by a fetch address, may be located in instruction cache 100 or in one of the next memory hierarchical levels such as in RAM 14. A plurality of instruction queues IQ-0, IQ-1, IQ-2, IQ-3, IQ-4, and IQ-5, are operably coupled to instruction cache 100 for storing a set of instructions fetched from the instruction cache 100 or from other hierarchical levels of memory. It will be appreciated that instruction queues IQ-0 through IQ-5 could be combined to form a common queue segmented to form a plurality of queues according to the present invention.

A fetch address selector 110 is operably coupled to instruction cache 100 for selecting the fetch address and for providing the fetch address to instruction cache 100 to fetch a new set of instructions from instruction cache 100 or from other levels of memory. Branch target calculators 112, 114, 116, 118, 120, and 122 are coupled to instruction queues IQ-0, IQ-1, IQ-2, IQ-3, IQ-4, and IQ-5, respectively, such that each instruction queue is associated with a branch target calculator. Branch target calculators 112–122 determine, in parallel, if instructions in the instruction queues IQ-0 through IQ-5 are branch instructions and provide, in parallel, a target address to fetch address selector 110 such that fetch address selector 110 can provide instruction cache 100 with one of a plurality of target addresses as the fetch address. In this manner, the target addresses of the branch instructions are available at the same time if one or more of the branch instructions are taken. Thus, instruction fetch unit 11 can process back-to-back branch instructions at a sustainable rate of one per cycle.

Instruction fetch unit 11 further includes branch resolution logic 124 operably coupled to fetch address selector 110 for resolving the branch instructions. Branch resolution logic 124 includes a branch history table for storing BHT entries for predicting the outcomes of the branch instructions. Branch history table 126 is operably coupled to instruction queues IQ-0 through IQ-5 for providing instruction queues IQ-0 through IQ-5 with the BHT entries at the same time that the set of instructions fetched from instruction cache 100 or other memory levels are stored in instruction queues IQ-0 through IQ-5. In other words, each time a newly fetched instruction is stored in one of the instruction queues, a BHT entry corresponding to the instruction is stored with the instruction in the instruction queue. Branch resolution logic 124 utilizes the branch prediction data contained within the BHT entries stored in instruction queues IQ-0 through IQ-5 to predict any unresolved branch instructions in the queues and resolve these branches according to the predictions. In this manner, multiple branch predictions can be performed in a single cycle. Branch target calculators 112–122 determine if an instruction in each respective instruction queue IQ-0 through IQ-5 is a branch instruction and provides a target address before or during the time in which the branch resolution logic 124 resolves the branch instructions such that the branch resolution logic 124 resolves a plurality of branch instructions in parallel. Instruction fetch unit 11 further includes a branch queue 128 operably coupled to each branch target calculator 112–122 for receiving the target addresses. Branch queue 128 is also operably coupled to each of the instruction queues IQ-0 through IQ-5 for receiving the predetermined addresses of the set of instructions stored in instruction queues IQ-0 through IQ-5. Branch queue 128 is also operably coupled to each of the instruction queues IQ-0 through IQ-5 for receiving the addresses of the set of instructions stored in instruction queues IQ-0 through IQ-5. Branch queue 128 saves, for each predicted branch outcome, either one of the target addresses from branch target calculators 112–122 if the predicted branch outcome is not taken or one of the instruction addresses stored in IQ-0 through IQ-5 or the next sequential address immediately following the instruction addresses stored in IQ-0 through IQ-5 if the predicted branch outcome is taken. In the case of a mispredicted branch outcome, the addresses saved in branch queue 128 are provided to fetch address selector 110 as resolve addresses, resolve addr0 and resolve addr1.

Instruction fetch unit 11 further includes a sequential address calculator 130 which has as an input the fetch address and as outputs the next sequential fetch address and the addresses of the instructions being fetched. The sequential fetch address is provided to fetch address selector 110, whereas the addresses of the instructions being fetched are provided to instruction queues IQ-0 through IQ-5. It is to be noted that instruction queues IQ-0 through IQ-5 store both instructions and the addresses for the instructions.

Instruction fetch unit 11 further includes an interrupt address generator 132 for providing an interrupt address to fetch address selector 110. Branch resolution logic 124 inputs all of the target addresses from branch target calculators 112–122, the interrupt address, the sequential fetch address, and the two resolved addresses from branch queue 128, resolve addr0 and resolve addr1. Branch resolution logic 124 prioritizes the target addresses, resolve addr0, resolve addr1, the sequential address, and the interrupt address from a highest priority address to a lowest priority address such that fetch address selector 110 selects the highest priority address as the fetch address. Typically, the highest priority is granted to the address corresponding to the oldest interrupt or mispredicted branch, i.e., an interrupt address or a resolve address. The target addresses of branch instructions in the IQs are granted the next highest priority and are prioritized further from oldest to youngest, and the sequential address is granted the lowest priority. It will be appreciated that other priority schemes may be utilized within the scope of the present invention. Fetch address selector 110 functions as a multiplexor to select the fetch address from one of the target addresses, the interrupt address, the sequential fetch address, or the resolved address. Thus, the target addresses, the interrupt address, the sequential fetch address, or the resolve addresses are potential fetch addresses from which one is selected as the fetch address.

Instruction cache 100 is a set associative cache having at least two memory banks or ways for storing sets of addressable instructions. Preferably, instruction cache 100 is a-two-way set associative cache having 8K bytes of memory or 4K bytes per way or per memory bank. Said another way, there are 4K bytes of memory for storing a first set of addressable instructions and 4K bytes of memory for storing a second set of addressable instructions.

It is to be understood that a "set" of instructions in a cache does not mean a row or line of instructions in a cache.

According to the invention, instruction fetch unit 11 further includes an effective address (EA) directory 134 and a comparator 136 operatively associated with instruction cache 100 for selecting one of the ways/banks/sets from which the instructions will be fetched. Directory 134 includes a plurality of inputs or ports 138, 140, 142, 144, 146, 148, 150, 152, 154, 156. Ports 144, 146, 148, 150, 152, and 154 receive target addresses from branch target calculators 112–122, respectively. Ports 140, 142 receive resolve addr1 and resolve addr0 from branch queue 128, respectively. Port 138 receives the sequential fetch address from sequential address calculator 130. Port 156 receives the interrupt address from interrupt address generator 132. In the preferred embodiment, the potential fetch addresses, i.e., the target addresses, resolve addresses, the sequential address, and the interrupt address are 32 bits. The lower 12 bits of each address contain the page offset of the instruction being addressed. These 12 bits are not translated. The upper 20 bits must be translated to determine what the correct Real Page Number should be. A real address consists of the translated real page number and the page offset, and thus the potential fetch addresses are effective addresses. The effective address directory 134 contains an effective address tag for identifying the location in cache 100 where instructions to be fetched can be found. Directory 134 is used to select one of the ways/banks/sets of cache 100 from which instructions are to be fetched. The inputs to directory 134 are the potential fetch addresses and the outputs of directory 134 are effective address tags corresponding to each potential fetch address and each way of cache 100. The outputs of directory 134 are inputted into a way0 multiplexor 133 for those effective address tags corresponding to a first way in cache 100 and a way1 multiplexor 135 for the effective address tags corresponding to a second way in cache 100. Thus, there are ten inputs to each multiplexor 133, 135 corresponding to the ten potential fetch addresses. One of the ten inputs, i.e., tags, of each multiplexor 133, 135 is selected which corresponds to the potential fetch address selected as the fetch address by the output of the branch resolution logic 124. The two selected tags are then compared to the effective fetch address in comparator 136 to determine which way/bank/set of cache 100 to select. The output of comparator 136 is coupled to a way0/way1 input of the instruction cache 100 for selecting one of the ways/banks/sets of cache 100.

Typically, the critical path, i.e., the path requiring the most time to complete, in a set associative cache, is through a directory to a compare circuit that selects which memory way/bank/set the instructions will be selected out of or accessed from the instruction cache 100. This path is generally referred to as the late select path. The present invention includes an apparatus and method for reducing the time required for the late select path. Before the instruction 100 cache can be accessed the target addresses, interrupt address, resolve addr0, resolve addr1, and sequential fetch address must be computed and/or generated, and one of these addresses must be selected as the fetch address by branch resolution logic 124 and fetch address selector 110. It takes more time for branch resolution logic 124 and fetch address selector 110 to select the fetch address than it takes to generate the target addresses, interrupt address, resolve addr0, resolve addr1, and sequential fetch address. Thus, these addresses are available for input to ports 138–156 of directory 134 prior to fetch address selector 110 selecting a fetch address. In other words, directory 134 is accessed prior to fetch address selector 110 selecting the fetch address. EA directory 134 contains an effective address tag as opposed to a real address tag. It will be appreciated that the present invention could be implemented using a multi-ported real address directory and translation shadow array (TSA) instead of utilizing effective address directory 134. A TSA translates effective addresses into real address counterparts. TSAs are sometimes referred to as Effective to Real Address Translators (ERATs). In the preferred embodiment, EA directory 134 is utilized to save area and power in CPU 10, since by using EA directory 134, a multi-ported TSA or a multi-ported real address (RA) directory is not needed to determine the way0/way1 input or late select. EA directory 134 does not eliminate the need for a TSA or a RA directory, since an instruction cache 100 miss would have to be translated to request new instructions and to insure that data or instructions in cache 100 are still associated with teh effective addresses under which they are stored. Thus, the preferred embodiment of the present invention includes a RA directory 102 and a TSA 104. Together, RA directory 102 and TSA 104 form a module 106 for determining whether information fetched from cache 100 is valid or in the case of a cache 100 miss, supply the next memory hierarchical level with the real address of the fetch address. The inputs to module 106 are the fetch address inputted into cache 100 and the output of comparator 136 which, in turn, is coupled to way0/way1 input of cache 100. For the preferred embodiment, it is to be noted that the fetch address is an effective address. The outputs of module 106 are the real address of the fetch address and a signal indicating whether the information fetched from cache 100 was valid. Further, processor space and power can be saved by reducing the size of EA directory 134 by using only a partial effective address tag wherein only a portion of the bits available are used. By using only a partial effective address tag, aliasing problems may occur, and false instruction cache 100 hits may occur. The aliasing problem may be detected by RA directory 102 and TSA 104 so that the correct instructions can be fetched and loaded into instruction cache 100.

The present invention also includes a method for fetching instructions in an information handling system including a set associative instruction cache 100 for storing first and second sets of addressable instructions, a directory 134 operatively associated with instruction cache 100 for selecting one of the sets from which instructions are fetched, instruction queues IQ-0 through IQ-5 operatively coupled to cache 100 for storing a set of fetched instructions, branch target calculators 112–122 operatively coupled to instruction queues IQ-0 through IQ-5, and a fetch address selector 110. The method comprises the steps of determining, in parallel, in the branch target calculators 112–122, if the instructions in the instruction queues IQ-0 through IQ-5 are branch instructions; calculating in parallel in the branch target calculators 112–122, the target addresses of the branch instructions; selecting, in the fetch address selector, a fetch address for fetching a new set of instructions from cache 100; and accessing the directory with the target addresses and other potential fetch addresses prior to the fetch address selector selecting a fetch address from the potential fetch addresses. The method further includes the steps of providing branch resolution logic 124 operably coupled to fetch address selector 110 and resolving in branch resolution logic 124 the branch instructions. The determining and calculating steps are performed either before or during the time in which the resolving step is performed. The resolving step further includes the step of predicting the outcomes of the branch instructions. Predicting the outcomes of the branch instructions is accomplished by providing a branch history table 126 including BHT entries. The method of the present invention further includes storing the BHT entries in instruction queues IQ-0 through IQ-5 at the same time that the set of fetched instructions are stored in instruction queues IQ-0 through IQ-5.

The method further includes the step of providing a branch queue 128 coupled to each branch target calculator 112–122, each instruction queue IQ-0 through IQ-5, and the fetch address selector 110, and the step of receiving in the branch queue 128 the target addresses and the addresses of the set of instructions stored in the instruction queues IQ-0 through IQ-5. The method of the present invention further includes the steps of saving, in the branch queue for each predicted branch outcome, the target address of the set of fetched instructions stored in the instruction queues if the predicted branch outcome is taken; and providing, in the case of a misprediction of a branch outcome, at least one resolved branch address to the fetch address selector wherein each of the resolved branch addresses are the addresses saved in the branch queue. The method further includes the step of providing a sequential address and an interrupt address to the fetch address selector 110 and EA directory 134. The method further comprises the step of prioritizing in the branch resolution logic 124 the target addresses, each resolve address, the sequential address, and the interrupt address from a highest priority address to a lowest priority address, and wherein the selecting step further includes the step of selecting the highest priority address as the fetch address.

Figure 6:
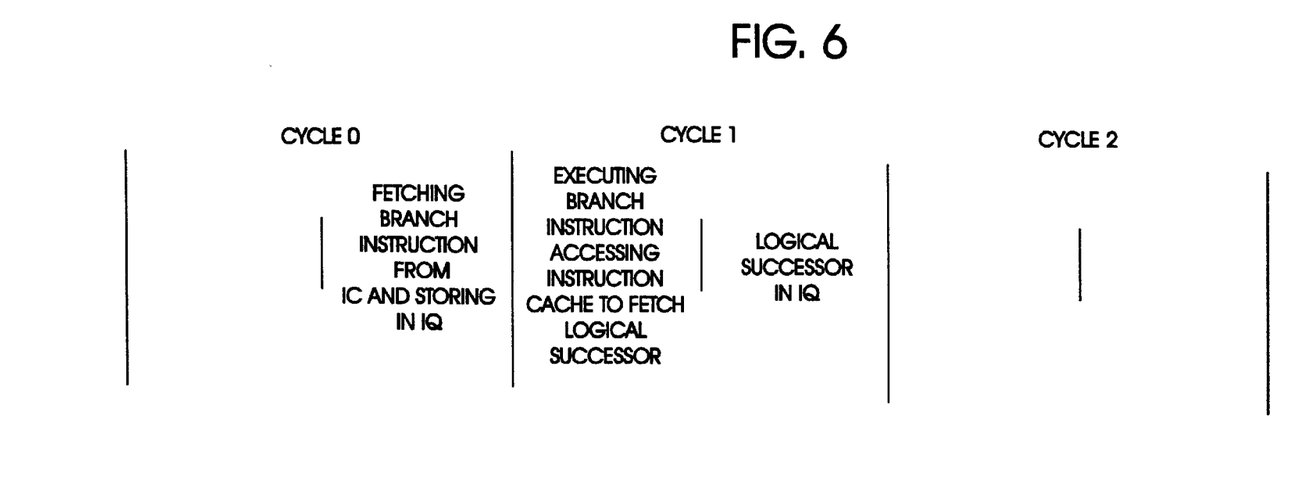
FIG. 6 is a cycle time line illustrating instruction fetching according to the present invention.

Referring now to the cycle time line in FIG. 6, a method according to the invention for fetching a new instruction from a set associative cache for storing first and second sets of instructions to be fetched in an information handling system operating at a predetermined number of cycles per second and including a directory operatively associated with the cache for selecting one of the sets from which the instructions are fetched is illustrated. The method includes performing the following steps in a first portion of the cycle to determine a fetch address: decoding a current instruction if the current instruction is a branch instruction; and if the current instruction is a branch instruction, calculating the target address of the branch instruction and resolving the branch instruction in parallel. The method further includes selecting a fetch address for fetching a new instruction from the cache and accessing the directory with the target address prior to completing the resolution of the branch instruction and selecting a fetch address in the first portion of the cycle. The method further includes fetching, using the fetch address, the new instruction from the cache during a second portion of the cycle so that the logical successor can be stored in an instruction queue prior to completion of a cycle. The decoding of instructions, calculating the target addresses of branch instructions, accessing the directory, and resolving branch instructions are performed in parallel instead of sequentially and, in this manner, may be performed during the first portion of the cycle instead of requiring a complete cycle. In this manner, fetching a new instruction can be performed within a cycle and back-to-back taken branches can be executed at a sustainable rate of one per cycle.

Although the present invention and its advantages have been described in detail, it should be understood that various changes, substitutions and alterations can be made herein without departing from the spirit or scope of the invention as defined in the appended claims.

What is claimed is:

1. In an information handling system, an apparatus for fetching instructions comprising:

a cache for storing first and second sets of addressable instructions;

instruction queues operably coupled to said cache for storing a set of fetched instructions;

fetch address selector operably coupled to said cache for selecting a fetch address and for providing said fetch address to said cache to fetch a new set of instructions;

at least one branch target calculator operably coupled to said instruction queues and to said fetch address selector for determining, in parallel, if instructions in said instruction queues are branch instructions and for providing, in parallel, target addresses of the branch instructions to said fetch address selector so that said fetch address selector can provide said cache with one of a plurality of target addresses as said fetch address; and a directory operatively associated with said cache for selecting one of said sets from which said instructions are fetched, said directory including a plurality of input ports coupled to said branch target calculator for inputting said plurality of target addresses in parallel with said fetch address selector such that said directory is accessed prior to said fetch address selector selecting said fetch address.

2. The apparatus, as recited in claim 1, further comprising branch resolution logic operably coupled to said fetch address selector for resolving or predicting said branch instructions.

3. The apparatus, as recited in claim 2, wherein said branch target calculator determines if an instruction in said instruction queue is a branch instruction and provides a target address before or during the time in which said branch resolution logic resolves said branch instructions such that said branch resolution logic resolves a plurality of said branch instructions in parallel.

4. The apparatus, as recited in claim 2, wherein said branch resolution logic includes prediction means for predicting the outcomes of said branch instructions.

5. The apparatus, as recited in claim 4, wherein said prediction means includes a branch history table including BHT entries.

6. The apparatus, as recited in claim 5, wherein said branch history table is operably coupled to said instruction queues for providing said instruction queues with said BHT entries at the same time that said set of fetched instructions are stored in said instruction queues.

7. The apparatus, as recited in claim 2, further comprising a branch queue operably coupled to said branch target calculator for receiving said target addresses, operably coupled to said instruction queues for receiving the addresses of said set of fetched instructions stored in said instruction queues, and operably coupled to said fetch address selector for providing said fetch address selector and said directory with at least one resolved address.

8. The apparatus, as recited in claim 7, further comprising a sequential address calculator for providing a sequential address to said fetch address selector and to said directory.

9. The apparatus, as recited in claim 8, wherein each of said instruction queues store an address for said instruction stored in said instruction queue.

10. The apparatus, as recited in claim 9, wherein said sequential address calculator is operably coupled to said instruction queues for providing the addresses of said instructions stored in said instruction queues.

11. The apparatus, as recited in claim 8, further comprising an interrupt address generator for providing an interrupt address to said fetch address selector and to said directory.

12. The apparatus, as recited in claim 11, wherein said branch resolution logic includes means for prioritizing said target addresses, each said resolved address, said sequential address, and said interrupt address provided to said fetch address selector from a highest priority address to a lowest priority address such that said fetch address selector selects said highest priority address as said fetch address.

13. The apparatus, as recited in claim 1, wherein said fetch address selector comprises a multiplexor.

14. The apparatus, as recited in claim 1, wherein said cache is a set associative cache.

15. The apparatus, as recited in claim 1, wherein said directory is an effective address directory.

16. A method for fetching instructions in an information handling system including a cache for storing first and second sets of addressable instructions, a directory operatively associated with the cache for selecting one of the sets from which the instructions are fetched, instruction queues operatively coupled to the cache for storing a set of fetched instructions, at least one branch target calculator operatively coupled to the instruction queues and a fetch address selector, said method comprising the steps of:
  determining in parallel, in the branch target calculator, if the instructions in the instruction queues are branch instructions;
  calculating in parallel, in the branch target calculator, target addresses of the branch instructions;
  selecting, in the fetch address selector, a fetch address for fetching a new set of instructions from the cache; and
  accessing the directory with the target addresses prior to the fetch address selector selecting the fetch address.

17. The method, as recited in claim 16, further comprising the steps of:
  providing branch resolution logic operably coupled to the fetch address selector; and
  resolving, in the branch resolution logic, the branch instructions.

18. The method, as recited in claim 17, wherein said determining and calculating steps are performed either before or during the time in which said resolving step is performed.

19. The method, as recited in claim 17, wherein said resolving step further includes the step of predicting the outcomes of the branch instructions.

20. The method, as recited in claim 19, wherein said predicting step includes the step of providing a branch history table including BHT entries.

21. The method, as recited in claim 20, wherein said step of providing a branch history table further includes the step of storing said BHT entries in the instruction queues at the same time that the set of fetched instructions are stored in the instruction queues.

22. The method, as recited in claim 17, further comprising the step of providing a branch queue coupled to each branch target calculator, the instruction queues, and the fetch address selector.

23. The method, as recited in claim 22, further comprising the step of receiving, in the branch queue, the target addresses and the addresses of the set of instructions stored in the instruction queues.

24. The method, as recited in claim 23, further comprising the steps of:
  saving, in the branch queue for each predicted branch outcome, the target address of the set of fetched instructions stored in the instruction queues if the predicted branch outcome is taken; and
  providing, in the case of a misprediction of a branch outcome, at least one resolved branch address to the fetch address selector wherein each of said resolved branch addresses are said addresses saved in the branch queue.

25. The method, as recited in claim 24, further comprising the step of providing a sequential address to the fetch address selector and the directory.

26. The method, as recited in claim 25, further comprising the step of providing an interrupt address to the fetch address selector and the directory.

27. The method, as recited in claim 26, further comprising the step of prioritizing, in the branch resolution logic, the target addresses, each resolved address, the sequential address and the interrupt address from a highest priority address to a lowest priority address.

28. The method, as recited in claim 27, wherein said selecting step further includes the step of selecting the highest priority address as the fetch address.

29. The method, as recited in claim 16, wherein the cache is a set associative cache.

30. The method, as recited in claim 16, wherein the directory is an effective address directory.

31. A method for fetching a new instruction from a cache for storing first and second sets of instructions to be fetched in an information handling system operating at predetermined number of cycles per second and including a directory operatively associated with the cache for selecting one of the sets from which the instructions are fetched, said method comprising the steps of:
  performing the following steps in a first portion of the cycle to determine a fetch address:
    a) decoding a current instruction to determine if the current instruction is a branch instruction;
    b) if the current instruction is a branch instruction, performing the following steps in parallel:
      i) calculating the target address of the branch instruction, and
      ii) resolving the branch instruction;
    c) selecting a fetch address for fetching a new instruction from the cache; and
    d) accessing the directory with the target address prior to completing the resolution of the branch instruction and selecting a fetch address; and
  fetching, using the fetch address, the new instruction from the cache during a second portion of the cycle.

32. In an information handling system, an apparatus for fetching instructions comprising:
  (a) a cache for storing first and second sets of addressable instructions, such an instruction having a fetch address for fetching the instruction from the cache;
  (b) first and second instruction queues ("IQs") operably coupled to the cache for storing fetched instructions;
  (c) first and second branch target calculators ("BTCs") operably coupled to a corresponding one of the IQs, for calculating respective first and second branch instruction target addresses;
  (d) a fetch address selector ("FAS"), operably coupled to the cache and the BTCs, for providing to the cache a selected fetch address in response to the branch instruction target addresses; and
  (e) a directory operatively associated with said cache for selecting one of said sets from which instructions are fetched, said directory including a plurality of input ports coupled to said first and second BTCs for inputting said first and second branch instruction target addresses in parallel with said FAS such that said directory is accessed prior to said FAS selecting said fetch address.

33. The system of claim 32, wherein the BTCs calculate the target addresses and the FAS provides the fetch address during a single processing cycle of the system.

34. The system of claim 32, wherein said cache is a set associative cache.

35. The system of claim 32, wherein said directory is an effective address directory.

36. In an information handling system, an apparatus for fetching instructions comprising:

(a) a cache for storing first and second sets of addressable instructions, such an instruction having a fetch address for fetching the instruction from the cache;

(b) a fetch address selector ("FAS"), operably coupled to the cache, for providing to the cache a selected fetch address from a plurality of potential fetch addresses; and (c) a directory operatively associated with said cache for selecting one of said sets from which instructions are fetched, said directory including a plurality of input ports for inputting said plurality of potential fetch addresses such that said directory is accessed prior to said FAS selecting said fetch address.

37. The system of claim 36, further including first and second branch target calculators ("BTCs") for calculating respective first and second branch target addresses for fetched instructions wherein said potential fetch addresses include said first and second branch target addresses.

38. The system of claim 37, wherein the BTCs calculate the target addresses and the FAS provides the fetch address during a single processing cycle of the system.

39. The system of claim 36, wherein said cache is a set associative cache.

40. The system of claim 36, wherein said directory is an effective address directory.

41. A method for fetching instructions in an information handling system, said method comprising the steps of:

storing first and second sets of addressable instructions in a cache wherein such an instruction has a fetch address for fetching the instruction from a cache;

providing to the cache a selected fetch address from a plurality of potential fetch addresses; and inputting the plurality of potential fetch addresses into a directory for selecting one of the sets from which instructions are fetched such that the directory is accessed prior to providing the cache a selected fetch address.

* * * * *